United States Patent
Takeuchi

(10) Patent No.: US 7,880,442 B2
(45) Date of Patent: Feb. 1, 2011

(54) CHARGING CONTROL DEVICE FOR A STORAGE BATTERY

(75) Inventor: Motohiro Takeuchi, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 354 days.

(21) Appl. No.: 12/254,112

(22) Filed: Oct. 20, 2008

(65) Prior Publication Data

US 2009/0115376 A1 May 7, 2009

(30) Foreign Application Priority Data

Nov. 7, 2007 (JP) ................. 2007-289949

(51) Int. Cl.
*H02J 7/00* (2006.01)
*B60V 1/20* (2006.01)
*B60K 1/00* (2006.01)

(52) U.S. Cl. ............... 320/157; 320/152; 320/160; 180/116; 180/65.1; 180/65.29

(58) Field of Classification Search .......... 320/157
See application file for complete search history.

(56) References Cited

U.S. PATENT DOCUMENTS

| | | | |
|---|---|---|---|
| 5,617,007 A | | 4/1997 | Keidl et al. |
| 6,037,751 A | * | 3/2000 | Klang ............... 320/160 |
| 6,611,115 B2 | * | 8/2003 | Wakashiro et al. ... 318/139 |
| 7,075,306 B2 | * | 7/2006 | Emori et al. ........ 324/430 |
| 2002/0084785 A1 | * | 7/2002 | Park ................ 324/433 |

FOREIGN PATENT DOCUMENTS

| | | |
|---|---|---|
| JP | 07-312233 A | 11/1995 |
| JP | 2004-085269 A | 3/2004 |

OTHER PUBLICATIONS

"Development of an on-board charge and discharge management system for electric-vehicle batteries" by Alzieu et al., Journal of Power Sources 53 (1995) pp. 327-333.

* cited by examiner

*Primary Examiner*—Edward Tso
*Assistant Examiner*—Yalkew Fantu
(74) *Attorney, Agent, or Firm*—McDermott Will & Emery LLP

(57) ABSTRACT

One of first through fourth target state of charge levels, which are set at values that increase gradually over time, is selected on the basis of an ON/OFF state of a specific current consumer installed in the vehicle and a state of charge immediately preceding an engine stoppage. A target state of charge is set on the basis of the selected target state of charge level and an elapsed time after the lead storage battery is installed in the vehicle, whereupon the target state of charge is compared with the actual state of charge of the lead storage battery. The lead storage battery is charged in accordance with the comparative result.

6 Claims, 6 Drawing Sheets

CHARGING CONTROL DEVICE FOR A STORAGE BATTERY

CROSS-REFERENCE TO RELATED APPLICATIONS

The disclosure of Japanese Patent Application No. 2007-289949, filed on Nov. 7, 2007 including the specification, drawings and abstract is incorporated herein by reference in its entirety.

BACKGROUND OF THE INVENTION

1. Field of the Invention

The present invention relates to a charging control device for a storage battery, which controls a charging voltage applied to a storage battery in accordance with at least a state of charge of the storage battery.

2. Description of the Related Art

During conventional storage battery management control for improving fuel efficiency, the state of the storage battery must be monitored to detect overcharging and the like early.

Typical well-known methods of estimating a state of charge include a method of calculating the state of charge from an internal resistance value and an electromotive force, a method of calculating the state of charge using the specific gravity of an electrolyte as an index, and a method of constantly measuring a current value discharged from or charged to the storage battery, and calculating the state of charge by integrating the resultant current measurement value.

However, when the current value is integrated continuously over a long time period, an accumulated error increases such that the state of charge determined by the calculation gradually diverges from the actual storage battery state of charge, and therefore, the state of charge of a lead storage battery cannot be grasped accurately. As a result, overcharging and deep discharge increase, causing the lead storage battery to deteriorate.

In response to this problem, Japanese Unexamined Patent Application Publication 2004-85269, for example, discloses a technique in which an open circuit voltage is estimated from the course of a terminal voltage of a lead storage battery, which is measured within a brief time period following the completion of charging/discharging of the lead storage battery, the state of charge is determined on the basis of the estimated open circuit voltage, and a current state of charge is updated sequentially using the determined state of charge in order to determine the state of charge with a high degree of precision.

However, with the technique disclosed in the above document, a lithium ion storage battery or the like, in which variation in the terminal voltage of the storage battery and variation in the state of charge appear substantially synchronously, is unlikely to be affected by an accumulated error. In a storage battery such as a lead storage battery, on the other hand, in which a delay is likely to occur during convergence of the terminal voltage depending on the polarization, it is extremely difficult to estimate the open circuit voltage within a limited time period. Hence, there is a limit to the precision with which the state of charge can be determined on the basis of the open circuit voltage.

SUMMARY OF THE INVENTION

In consideration of the circumstances described above, an object of the present invention is to provide a charging control device for a storage battery which is capable of reducing the effect of an accumulated error occurring when a state of charge of the storage battery is estimated on the basis of a value obtained by integrating a charge and discharge current of the storage battery over a long time period, thereby suppressing overcharging and deep discharge such that the advancement of deterioration of the storage battery is suppressed.

To achieve this object, a charging control device for a storage battery according to the present invention comprises: a storage battery installed in a vehicle; state of charge calculating means for calculating a state of charge of the storage battery; storage means for storing the calculated state of charge; target state of charge setting means for setting a target state of charge on the basis of at least the state of charge stored in the storage means when an ignition switch is switched ON; and charging voltage control means for controlling a charging voltage applied to the storage battery on the basis of a state of charge on engine start-up and the target state of charge, wherein the target state of charge setting means set the target state of charge on the basis of an elapsed time after the storage battery is installed in the vehicle such that the target state of charge increases as the elapsed time increases.

According to the present invention, the target state of charge is set on the basis of the elapsed time after the storage battery is installed in the vehicle such that the target state of charge increases as the elapsed time increases, and therefore the effect of an accumulated error included in the state of charge can be absorbed by the increase in the target state of charge. As a result, an accumulated error occurring during estimation of the state of charge is unlikely to affect control of the charging voltage applied to the storage battery, and therefore overcharging and deep discharge can be suppressed such that the advancement of deterioration of a lead storage battery can be suppressed.

DESCRIPTION OF THE PREFERRED EMBODIMENTS

Figure 1:
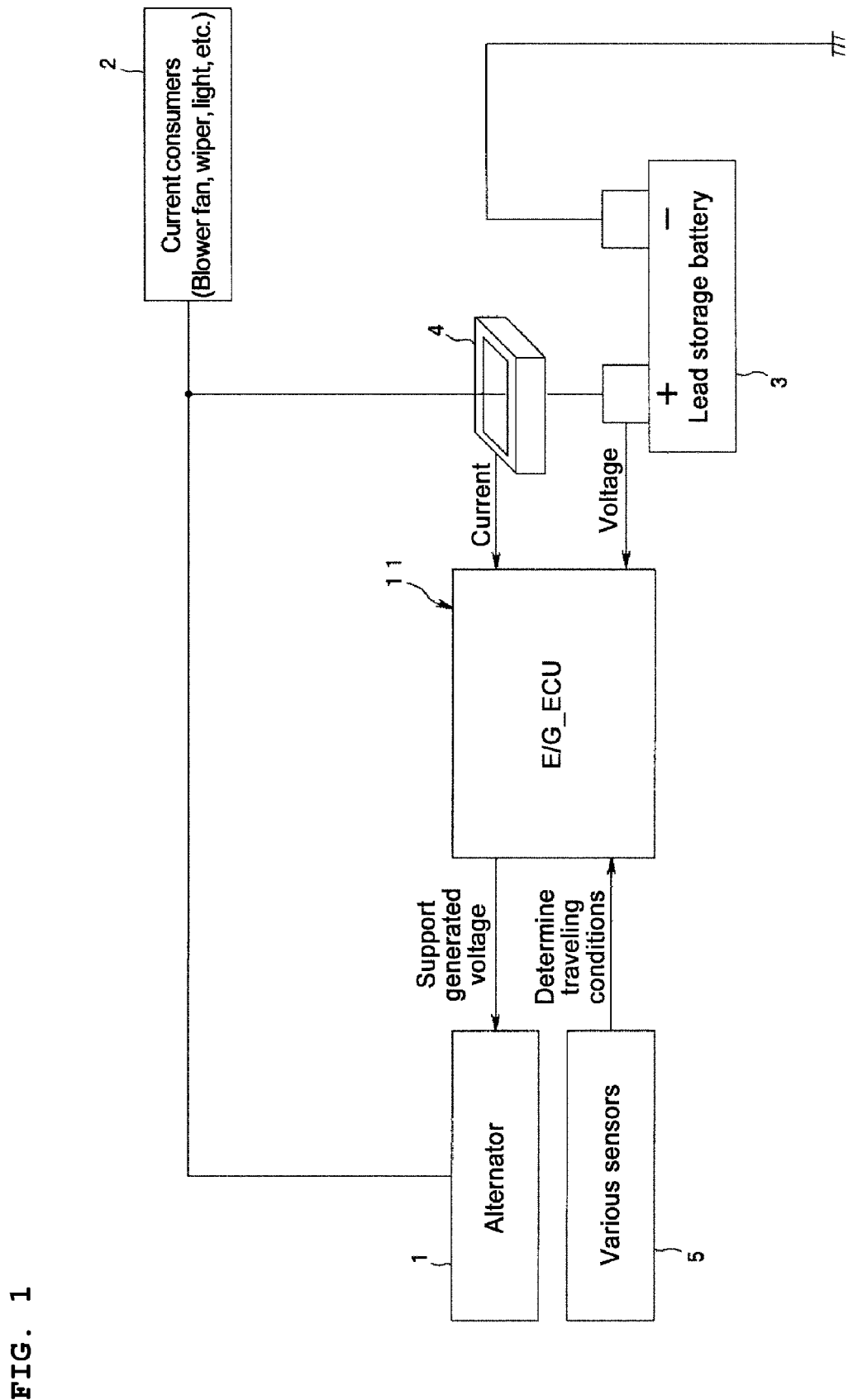
FIG. 1 is a block diagram of a vehicle power system.

An embodiment of the present invention will be described below on the basis of the drawings. FIG. 1 is a block diagram showing a vehicle power system.

The reference numeral 1 in the drawing denotes an alternator serving as a power generator installed in a vehicle, which is driven by an engine, not shown in the drawing, to output generated power. The generated power of the alternator 1 is supplied to a routinely employed current consumer, current consumer means 2 having a comparatively large load, and a lead storage battery 3. Note that the current consumer means 2 include any device that applies a comparatively large electric load of a predetermined value or more to the lead storage battery 3, such as a blower fan, a wiper motor, a light bulb, and a rear defogger.

Meanwhile, the reference numeral 11 denotes an engine control unit (to be referred to hereafter as "E/G_ECU") for controlling the entire engine. The E/G_ECU 11 controls the entire engine, including fuel injection control, ignition timing control, and control of the alternator 1, and has a main body constituted by a microcomputer including a CPU, ROM, and RAM, which are universally known, backup RAM serving as storage means, nonvolatile storage means such as EEPROM, and soon. The E/G_ECU 11 performs various types of control, and of these various types of control, control of the alternator 1 will be described below.

A current sensor 4 for detecting a charge/discharge current of the lead storage battery 3 and various sensors 5 for detecting traveling conditions of the vehicle are connected to an input side of the E/G_ECU 11, and a voltage of the lead storage battery 3 is input directly into the input side of the E/G_ECU 11. The sensors 5 for detecting the traveling conditions of the vehicle include an engine rotation speed sensor for detecting an engine rotation speed and a vehicle speed sensor for detecting a vehicle speed. The E/G_ECU 11 controls a generated voltage of the alternator 1 on the basis of the various input information.

Figure 2:
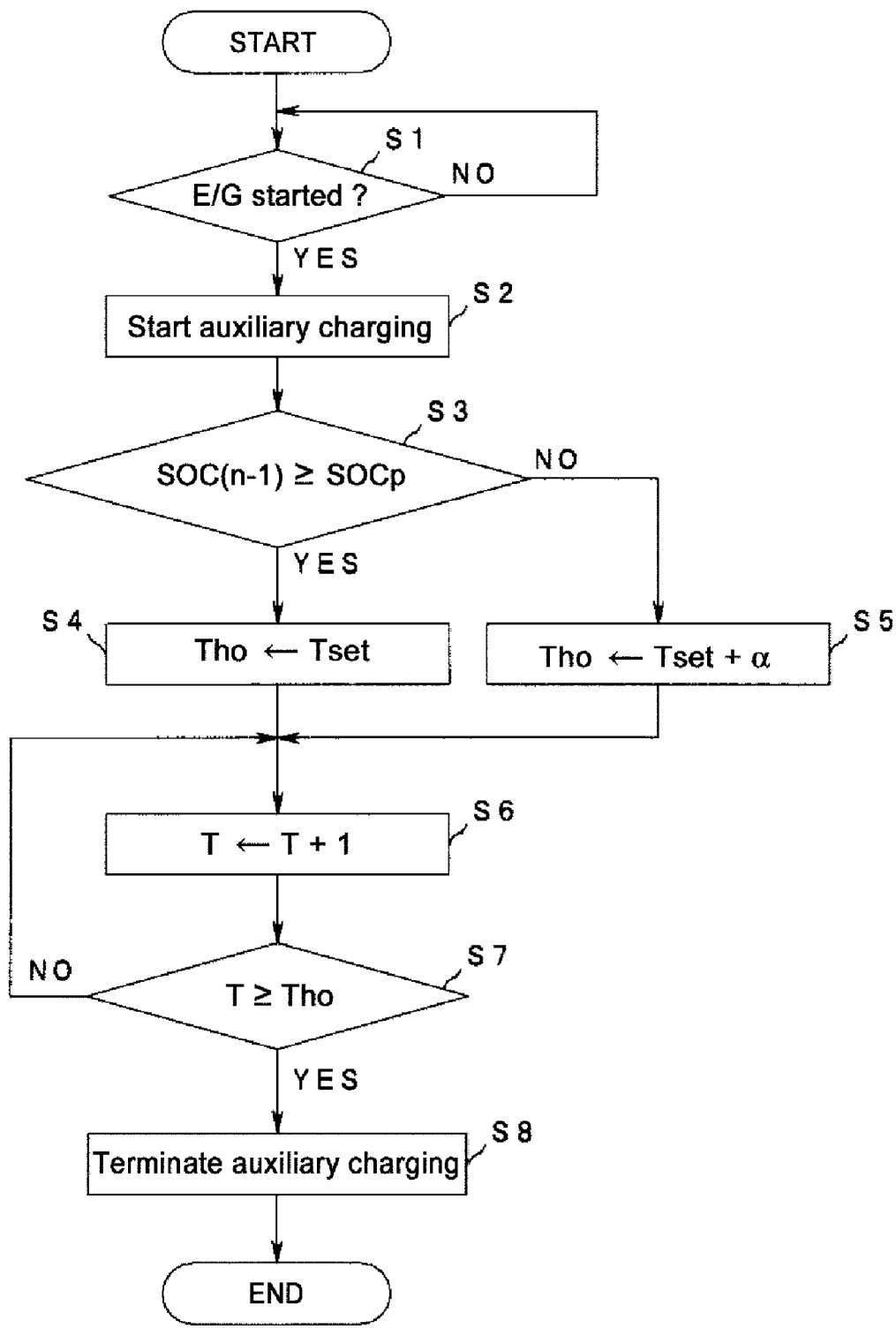
FIG. 2 is a flowchart showing a start-up control start condition determination routine.
Figure 3:
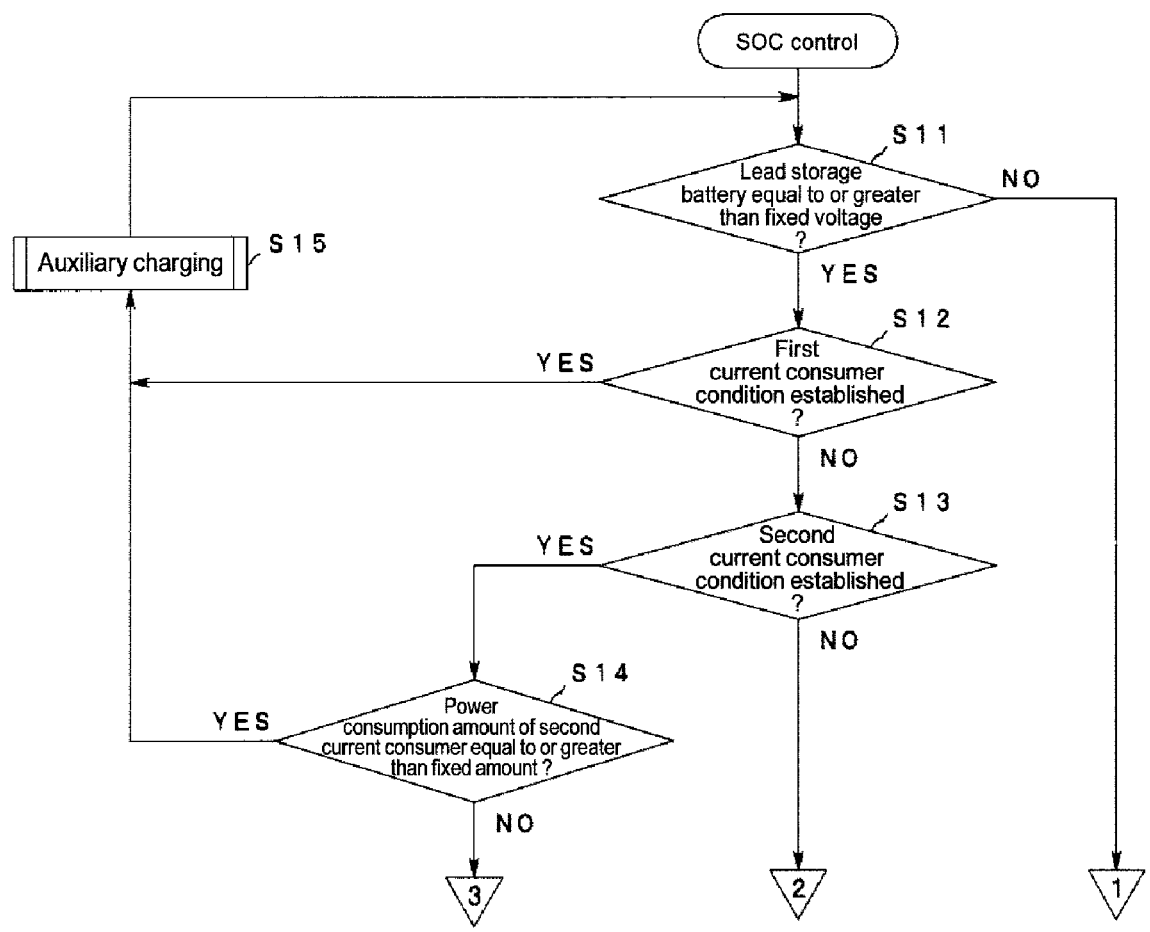
FIG. 3 is a flowchart showing an SOC control routine (1)
Figure 4:
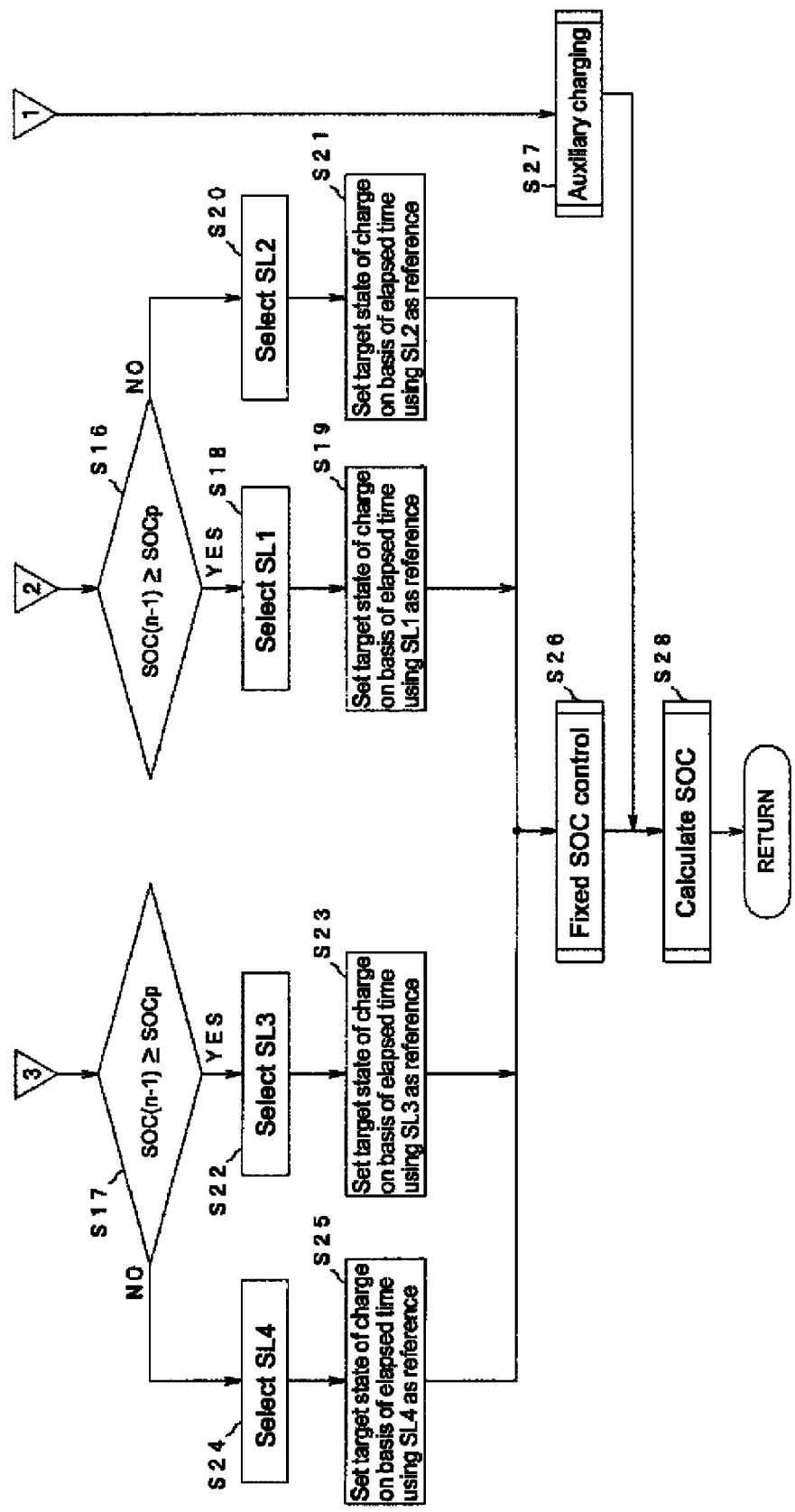
FIG. 4 is a flowchart showing an SOC control routine (2)

Power generation control of the alternator 1, which is executed by the E/G_ECU 11, is processed specifically in accordance with the flowcharts shown in FIGS. 2 to 4. Note that the processing shown in the flowcharts of FIGS. 2 to 4 corresponds to charging voltage control means of the present invention.

A start-up control start condition determination routine shown in FIG. 2 is executed only once after an ignition switch has been switched ON. In this routine, a determination is made in a first step S1 as to whether or not the engine has been started. Start-up of the engine is determined on the basis of the engine rotation speed, which is detected by the engine rotation speed sensor, for example, such that when the engine rotation speed is equal to or greater than a start-up determination rotation speed (600 [rpm], for example), it is determined that the engine has been started.

When the engine rotation speed exceeds the start-up determination rotation speed, the routine advances to a step S2, in which auxiliary charging is performed on the lead storage battery 3 by outputting an auxiliary charging command signal to the alternator 1 to start the auxiliary charging. Note that in this embodiment, auxiliary charging is performed on the lead storage battery 3, which has a rated voltage of 12 [V], at a fixed voltage of 14.5 [V]. Upon completion of a previous engine operating cycle, the storage battery state of charge of the lead storage battery 3 may have decreased due to self-discharge and so on, and therefore, by starting auxiliary charging immediately after engine start-up, a deficiency in the storage battery state of charge can be avoided.

Next, the routine advances to a step S3, in which a previous storage battery state of charge SOC (n−1) is compared to a state of charge determination value SOCp to determine whether or not the previous storage battery state of charge SOC (n−1) is in the vicinity of full charge. Note that in this embodiment, the storage battery state of charge SOC is calculated on the basis of an integrated value (integrated current value) In of the charge/discharge current of the lead storage battery 3, which is detected by the current sensor 4 during an engine operation. More specifically, the storage battery state of charge SOC is calculated by subtracting the integrated current value In from a preset full charge capacity Q and dividing the resultant value by the full charge capacity Q (SOC=(Q−In)/Q). Processing for calculating the storage battery state of charge SOC corresponds to storage battery state of charge calculating means of the present invention.

In this case, assuming that the storage battery state of charge SOC at full charge is 100 [%], the state of charge determination value SOCp is set at 90 to 100 [%]. A procedure for calculating the integrated current value In will be described below. Further, the previous storage battery state of charge SOC (n−1) is a storage battery state of charge SOC stored in the backup RAM when the ignition switch is switched ON. The storage battery state of charge SOC determined immediately before a previous engine stoppage is stored in the backup RAM when the ignition switch is switched ON, and this storage battery state of charge SOC corresponds to the previous storage battery state of charge SOC (n−1).

When the previous storage battery state of charge SOC (n−1) is equal to or greater than the state of charge determination value SOCp (SOC (n−1)≧SOCp), this indicates that the previous storage battery state of charge SOC (n−1) is at or in the vicinity of full charge, and therefore the routine advances to a step S4. When the previous storage battery state of charge SOC (n−1) is smaller than the state of charge determination value SOCp (SOC (n−1)<SOCp), a charge deficiency is determined, and the routine bifurcates to a step S5.

When the routine advances to the step S4, an auxiliary charging time Tho is set at a preset fixed time period Tset (Tho←Tset), and the routine advances to a step S6. More specifically, the storage battery state of charge SOC (n−1) is determined from the integrated value of the charge/discharge current of the lead storage battery 3, but the reliability of the storage battery state of charge SOC (n−1) determined by this calculation is poor, and therefore auxiliary charging must always be performed for a fixed time period, even when the storage battery state of charge SOC (n−1) is determined to be at or in the vicinity of full charge.

When the routine advances to the step S5, the auxiliary charging time Tho is set at a value obtained by adding a set extended time period α to the aforementioned fixed time period Tset (Tho←Tset+α), whereupon the routine advances to the step S6. The set extended time period α may be a preset fixed time period or a variable value set in accordance with a difference between the storage battery state of charge SOC (n−1) and the state of charge determination value SOCp.

When the routine advances to the step S6 from the step S4 or the step S5, a counted time T of a counter timer is incremented (T←T+1), whereupon the routine advances to a step S7. In the step S7, a determination is made as to whether or not the counted time T of the counter timer has reached the auxiliary charging time Tho, whereupon auxiliary charging is continued until the counted time T of the counter timer reaches the auxiliary charging time Tho. When the counted time T of the counter timer reaches the auxiliary charging time Tho (T≧Tho), the routine advances to a step S8, in which an auxiliary charging stop command signal is output to the alternator 1. Once the alternator 1 has been stopped, the routine is terminated.

In this embodiment, auxiliary charging is performed immediately after engine start-up, and therefore each engine operating cycle invariably begins in a state where the state of charge of the lead storage battery 3 is at or near full charge. Thus, a long-term accumulated error in the storage battery state of charge SOC determined from the integrated value of the charge/discharge current of the lead storage battery 3 is corrected every time the engine is started, as will be described below. As a result, SOC control (to be described in detail below) can be executed with a high degree of precision within a single engine operating cycle extending from engine start-up to the point at which the ignition switch is switched OFF to stop the engine. Note that the processing of the steps S2 to S8 described above corresponds to post-start-up control means of the present invention.

Next, an SOC control routine shown in FIGS. 3 and 4 is executed at predetermined calculation period intervals. In a first step S11 of this routine, a terminal voltage VB of the lead storage battery 3 is read and a determination is made as to whether or not the terminal voltage VB is equal to or greater than a fixed voltage. When the terminal voltage VB is lower than the set voltage, the routine jumps to a step S27, in which an auxiliary charging command signal is output to the alternator 1 and the lead storage battery 3 is subjected to auxiliary charging using the generated voltage of the alternator 1 (in this embodiment, a fixed voltage of 14.5 [V] is applied to the lead storage battery 3 having a rated voltage of 12 [V]). The routine then advances to a step S28.

When the terminal voltage VB is higher than the fixed voltage, the routine advances to a step S12, in which a first current consumer condition is determined. The first current consumer is a current consumer such as a headlamp, a rear defogger, or a wiper, for example, which consumes a comparatively large amount of power so that when it is switched ON, SOC control must be prohibited immediately. When a current consumer that consumes a comparatively large amount of power is ON, it is determined that the first current consumer condition is established, and the routine bifurcates to a step S15.

When no current consumers that consume a comparatively large amount of power are ON, it is determined that the first current consumer condition is not established, and the routine advances to a step S13, in which a determination is made as to whether or not a second current consumer condition is established. The second current consumer is a current consumer such as a blower fan or a radiator fan, for example, which consumes a comparatively small amount of power so that an ON state can be permitted up to a fixed amount of power consumption.

When a current consumer that consumes a comparatively small amount of power is ON, it is determined that the second current consumer condition is established, and the routine advances to a step S14. When no second current consumers are ON, the routine advances to the step S16.

When the routine advances to the step S14, a determination is made as to whether or not the power consumption amount of the second current consumer is within an allowable range. When the power consumption amount is within the allowable range, the routine advances to a step S17, and when the power consumption amount exceeds the allowable range, the routine advances to the step S15.

When the routine advances to the step S15 from the step S12 or the step S14, an auxiliary charging command signal is output to the alternator 1, and the lead storage battery 3 is subjected to auxiliary charging using the generated voltage of the alternator 1 (in this embodiment, a fixed voltage of 14.5 [V] is applied to the lead storage battery 3 having a rated voltage of 12 [V]). The routine then returns to the step S11.

When the routine advances to the step S16 from the step S13 or advances to the step S17 from the step S14, a determination is made in the step S16 or the step S17 as to whether or not the previous storage battery state of charge SOC (n−1) is equal to or greater than the state of charge determination value SOCp. A degree of fatigue of the lead storage battery 3 is then determined from the result.

When the second current consumer condition is not established and the storage battery state of charge SOC (n−1) $\geq$ SOCp, it is determined that the degree of fatigue of the lead storage battery 3 is at a minimum, and the routine advances from the step S16 to a step S18, in which a first target state of charge level SL1 is selected. When the second current consumer condition is not established and the storage battery state of charge SOC (n−1)<SOCp, it is determined that the lead storage battery 3 is slightly fatigued, and the routine advances to a step S20, in which a second target state of charge level SL2 is selected.

On the other hand, when the power consumption amount of the second current consumer is within the allowable range and the storage battery state of charge SOC (n−1)$\geq$SOCp, it is determined that the lead storage battery 3 is fatigued, and the routine advances to a step S22, in which a third target state of charge level SL3 is selected. When the power consumption amount of the second current consumer is within the allowable range and the storage battery state of charge SOC (n−1)<SOCp, it is determined that the degree of fatigue of the lead storage battery 3 is large, and the routine advances to a step S24, in which a fourth target state of charge level SL4 is selected.

In other words, the respective target state of charge levels SL1 to SL4 are selected in accordance with the degree of fatigue of the lead storage battery 3 such that the value of the target state of charge level increases as the degree of fatigue increases (SL1<SL2<SL3<SL4).

Note that the processing of the steps S11 to S14, S16 to S18, S20, S22 and S24 corresponds to target state of charge setting means of the present invention.

Figure 5:
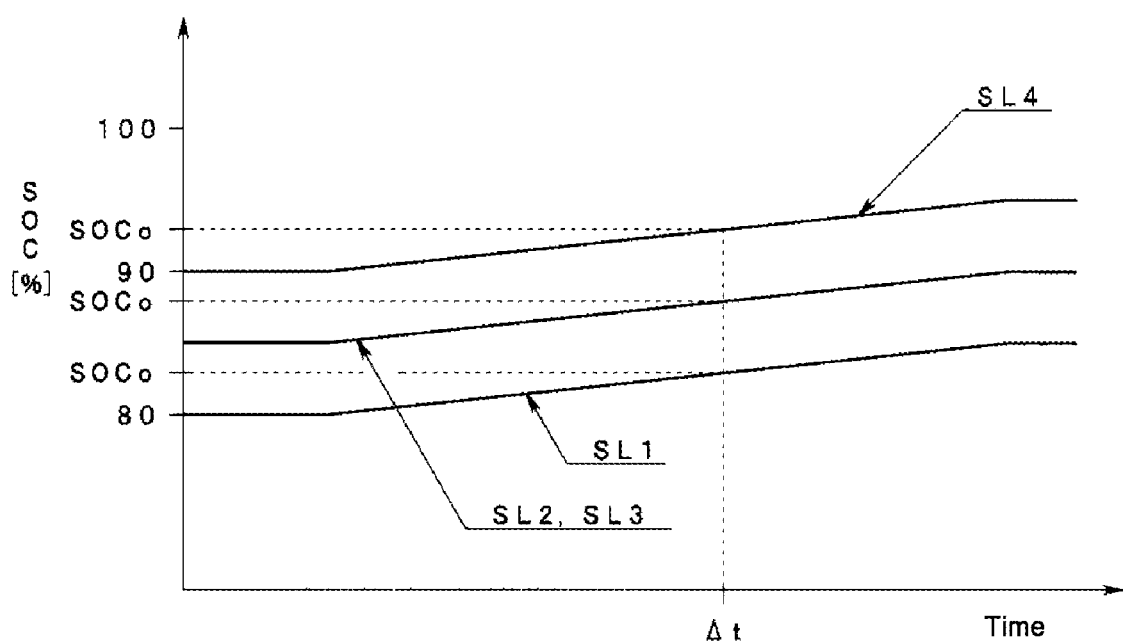
FIG. 5 is a conceptual diagram showing a target state of charge setting table.

A target state of charge SOCo at each target state of charge level SL1 to SL4 is stored in a target state of charge setting table stored in the ROM or the nonvolatile storage means. As shown in FIG. 5, the target state of charge setting table stores the target state of charge SOCo at each target state of charge level SL1 to SL4 in accordance with an elapsed time following installation of a new lead storage battery 3 into a vehicle and predetermined connection thereof such that the target state of charge SOCo increases gradually as the elapsed time increases.

Hence, when the routine advances to the step S19 from the step S18, the target state of charge SOCo is set on the basis of the elapsed time by referring to the first target state of charge level SL1. When the routine advances to the step S21 from the step S20, the target state of charge SOCo is set on the basis of the elapsed time by referring to the second target state of charge level SL2. When the routine advances to the step S23 from the step S22, the target state of charge SOCo is set on the basis of the elapsed time by referring to the third target state of charge level SL3. When the routine advances to the step S25 from the step S24, the target state of charge SOCo is set on the basis of the elapsed time by referring to the fourth target state of charge level SL4.

As shown in FIG. 5, the target states of charge SOCo at the respective target state of charge levels SL1 to SL4 differ from each other, and therefore, even when the elapsed time $\Delta t$ is the same, a target state of charge SOCo of a different value is set for each of the selected target state of charge levels SL1 to SL4.

Note that in this embodiment, assuming that the storage battery state of charge at full charge is 100 [%], the target state of charge SOCo at the first target state of charge level SL1 corresponds to SOC=approximately 80 to 85 [%], the target state of charge SOCo at the second target state of charge level SL2 and third target state of charge level SL3 corresponds to SOC=approximately 85 to 90 [%], and the target state of charge SOCo at the fourth target state of charge level SL4 corresponds to SOC=approximately 90 to 95 [%]. Further, as will be described below, when the storage battery state of charge SOC determined from the integrated value of the charge/discharge current of the lead storage battery 3 (to be referred to hereafter as the "calculated SOC") is equal to or greater than the target state of charge SOCo at the respective target state of charge levels SL1 to SL4, the lead storage battery 3 is charged by a second charging voltage (a low voltage). When the calculated SOC is smaller than the target state of charge SOCo at the respective target state of charge levels SL1 to SL4, on the other hand, the lead storage battery 3 is charged by a first charging voltage (a high voltage).

Hence, when the degree of fatigue of the lead storage battery 3 is large, a target state of charge level having a large value is selected so that the lead storage battery 3 can be restored early by a high voltage. When the degree of fatigue of the lead storage battery 3 is small, on the other hand, the load on the lead storage battery 3 is small even when a comparatively large voltage drop is permitted, and therefore a target state of charge level having a small value is selected, thereby increasing the number of opportunities to charge the lead storage battery 3 with a low voltage and correspondingly reducing unnecessary charging with a high voltage. As a result, the advancement of deterioration of the lead storage battery can be suppressed.

As is evident from Equation (1) below, a sensor error $\epsilon$ is subtracted from an integrated voltage value Vn in advance, and the sensor error $\epsilon$ is set at a positive value. Therefore, as shown by a broken line in FIG. 6, the calculated SOC (see Equation (2)) calculated on the basis of the integrated current value In, which is determined by subjecting the integrated voltage value Vn to electric charge conversion, takes a smaller value than an SOC (to be referred to hereafter as an "actual SOC") shown by a solid line, which is obtained through actual measurement. However, when the error of the current sensor 4 is larger than the initially set sensor error $\epsilon$, a situation in which the calculated SOC exceeds the actual SOC may occur, as shown by a dot-dash line in FIG. 6.

In this embodiment, however, the target state of charge SOCo at the respective target state of charge levels SL1 to SL4 is increased gradually over time, and therefore, even when the calculated SOC includes a long-term accumulated error, the accumulated error included in the calculated SOC is unlikely to have an effect. As a result, a switch timing of the charging voltage applied to the lead storage battery 3, which is set by comparing the calculated SOC with the target state of charge SOCo at the selected target state of charge level SL1 to SL4 is appropriate, and the calculated SOC can always be set at a lower value (direction in which battery dies=safety side) than the actual SOC. As a result, deep discharge of the lead storage battery 3 can be suppressed, unnecessary overcharging is not performed, and the advancement of deterioration of the lead storage battery can be suppressed. Note that the course (incline) of the target state of charge SOCo at each target state of charge level SL1 to SL4 over time is set on the basis of the performance of the lead storage battery 3 installed in the vehicle.

When the routine advances to the step S26 from the step S19, S21, S23 or S25, fixed SOC control is executed. In this fixed SOC control, the calculated SOC and the target state of charge SOCo are compared, and when SOC<SOCo, a high voltage charging command signal is output to the alternator 1, whereby the lead storage battery 3 is charged using a high charging voltage (in this embodiment, 14.5 [V] is applied to the lead storage battery 3 having a rated voltage of 12 [V]) serving as the first charging voltage through power generation by the alternator 1. Thus, the calculated SOC is raised to the target state of charge SOCo early. When SOC≧SOCo, on the other hand, the lead storage battery 3 is charged using the second charging voltage, which is a lower voltage than the first charging voltage.

The second charging voltage is set at a voltage that is identical to or slightly higher than a voltage for canceling out a discharge voltage supplied to a routinely employed current consumer in order to maintain vehicle travel, for example. Therefore, when the current consumer means 2 are OFF, the lead storage battery 3 is charged principally by the fixed SOC control with the result that a charging load applied to the lead storage battery 3 is reduced greatly.

Hence, in this embodiment, a switching level of the charging voltage applied to the lead storage battery 3 is divided into four stages, namely the first to fourth target state of charge levels SL1 to SL4, on the basis of the terminal voltage VB of the lead storage battery 3 and the calculated SOC, and when the calculated SOC is lower than the target state of charge SOCo at the respective target state of charge levels SL1 to SL4, the lead storage battery 3 is charged by the first charging voltage (high voltage). Thus, unnecessary overcharging is not performed, the load on the lead storage battery 3 can be lightened, and deterioration thereof can be suppressed.

When the routine advances to the step S28 from the step S26 or the step S27 described above, the current calculated SOC is calculated, whereupon the routine is exited. Various equations have been proposed for determining the calculated SOC, an example of which is shown below. First, the integrated voltage value Vn is calculated by time-integrating the charge/discharge current of the lead storage battery 3, which is detected by the current sensor 4 from the time at which the lead storage battery 3 is installed in the vehicle.

$$Vn = Vn(n-1) + (Vs - \epsilon) - Vos \tag{1}$$

Here, Vs is a voltage (output voltage) output from the current sensor 4, $\epsilon$ is the sensor error (positive value) of the current sensor 4, and Vos is a sensor offset value.

In this embodiment, the output voltage Vs of the current sensor 4 is not converted into a current value, and instead the output voltage Vs is introduced as is as a calculation value. The sensor offset Vos corresponds to a current 0 [A], and by subtracting the sensor offset Vos from the output voltage Vs, a value corresponding to a current value can be derived.

A value obtained by subtracting the sensor error $\epsilon$ from the integrated voltage value Vn is integrated, and therefore the accumulated error of the calculated SOC is minimized such that even when an error accumulates over a long time period, the calculated SOC does not diverge greatly from the actual SOC. Further, by setting the sensor error $\epsilon$ at a slightly larger value than the actual value, an accumulated error generated as a result of various error factors included in the integrated voltage value Vn can be reduced by the sensor error $\epsilon$.

The integrated voltage value Vn is then subjected to electric charge conversion into the integrated current value In, and on the basis of the integrated current value In and the preset full charge capacity Q, the calculated SOC is calculated from the following equation.

$$\text{Calculated SOC} = (Q - In)/Q \tag{2}$$

Figure 6:
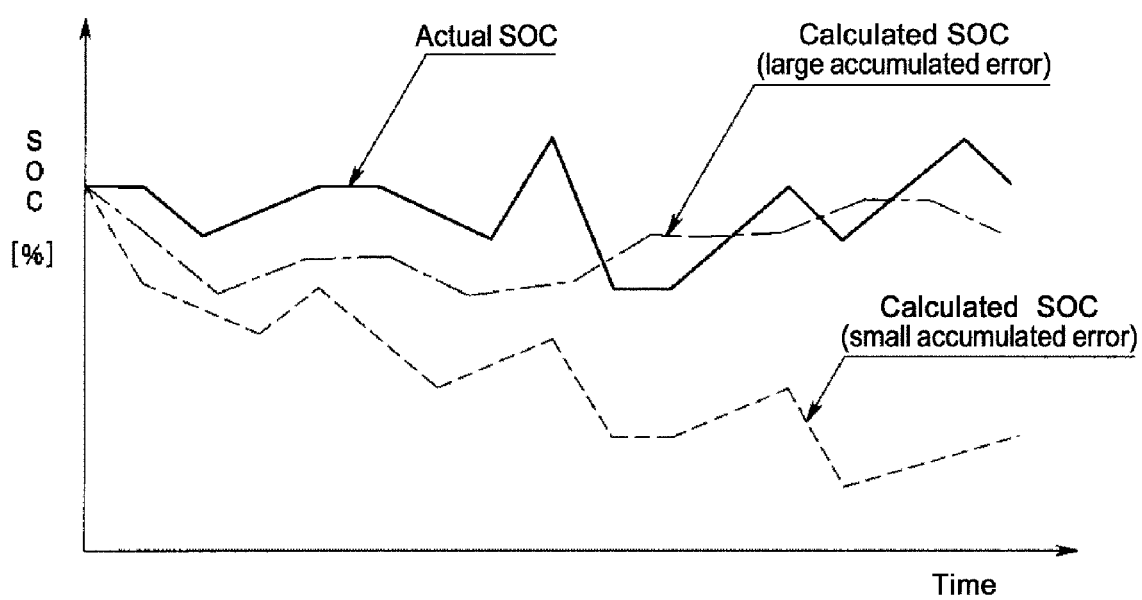
FIG. 6 is a chart comparing a calculated SOC and an actual SOC.

Hence, in this embodiment, the calculated SOC is calculated by subjecting the integrated voltage value Vn to electric charge conversion, without converting every output voltage Vs into a current value, and as a result, calculation errors can be minimized. Moreover, as shown in Equation (1), the sensor error $\epsilon$ of the current sensor 4 takes a positive value, and therefore, as shown in FIG. 6, the calculated SOC calculated on the basis of the integrated current value In can be set at a lower value (direction in which battery dies=safety side) than the actual SOC. In this case, even when an actual error of the current sensor 4 deviates further to the positive side than the preset sensor error $\epsilon$, the target state of charge SOCo at the respective target state of charge levels SL1 to SL4 is set to increase as time elapses, and therefore, even when the error accumulates in the integrated current value In, the calculated SOC never exceeds the actual SOC. As a result, deep discharge generated as a result of a long-term accumulated error in the calculated SOC can be suppressed, whereby the advancement of deterioration of the lead storage battery can be suppressed.

Note that the calculated SOC stored in the backup RAM is updated sequentially by the calculated SOC. Further, when the ignition switch is switched ON, the newest calculated SOC stored in the backup RAM is read as the previous storage battery state of charge SOC (n−1).

Incidentally, in Equation (2), the calculated SOC is determined from the integrated voltage value Vn, but as long as the integrated value can be represented by a physical quantity, the integrated voltage value Vn may be compared with a set value and counted.

More specifically, when Vn≧the set value, a count value Cn of an integrated value counter is incremented (Cn=Cn (n−1)+1), and when Vn<the set value, the count value Cn is decremented (Cn=Cn (n−1)−1). The calculated SOC is then determined from Equation (2) by subjecting the count value Cn to electric charge conversion into the integrated current value In. By calculating the calculated SOC on the basis of the count value Cn of an integration counter in this manner, the calculation load of the E/G_ECU 11 can be lightened.

In the embodiment described above, a case in which a lead storage battery is used as a storage battery was described. However, the present invention may be applied to various chargeable storage batteries other than a lead storage battery. Furthermore, an estimation method employing a current integration method was described as a method of estimating the storage battery state of charge, but a method of calculating the storage battery state of charge from an internal resistance value and an electromotive force or a method of calculating the storage battery state of charge using the specific gravity an electrolyte as an index, for example, may also be applied.

What is claimed is:

1. A charging control device for a storage battery, comprising:
    a storage battery installed in a vehicle;
    state of charge calculating means for calculating a state of charge of the storage battery;
    storage means for storing the calculated state of charge;
    target state of charge setting means for setting a target state of charge on the basis of at least the state of charge stored in the storage means when an ignition switch is switched ON; and
    charging voltage control means for controlling a charging voltage applied to the storage battery on the basis of a state of charge on engine start-up and the target state of charge,
    wherein the target state of charge setting means sets the target state of charge on the basis of an elapsed time after the storage battery is installed in the vehicle such that the target state of charge increases as the elapsed time increases.

2. The charging control device for a storage battery according to claim 1, wherein the charging voltage control means charges the storage battery to a first charging voltage when the state of charge on the engine start-up is lower than the target state of charge, and charges the storage battery to a second charging voltage, which is lower than the first charging voltage, when the state of charge is higher than the target state of charge.

3. The charging control device for a storage battery according to claim 1, wherein the target state of charge setting means includes a plurality of target state of charge levels, which are selected on the basis of a terminal voltage of the storage battery and the state of charge stored in the storage means when the ignition switch is switched ON and set so as to increase as the elapsed time increases, and sets the target state of charge on the basis of one selected target state of charge level and the elapsed time.

4. The charging control device for a storage battery according to claim 1, wherein the charging voltage control means includes post-start-up control means, and during an auxiliary charging of the storage battery, which is performed immediately after the engine start-up, the post-start-up control means compares the state of charge stored in the storage means with a set value, and when the state of charge is lower than the set value, continues the auxiliary charging in order to raise the state of charge, and then begins processing to control the charging voltage applied to the storage battery.

5. The charging control device for a storage battery according to claim 1, wherein the charging voltage control means controls the charging voltage applied to the storage battery when a voltage of the storage battery is equal to or greater than a constant value and a current consumer of a specific system installed in the vehicle is equal to or lower than a predetermined value.

6. The charging control device for a storage battery according to claim 1, wherein the state of charge calculating means calculates the state of charge on the basis of an integrated value of a charge and discharge current of the storage battery, the charge and discharge current being detected by a current sensor.

* * * * *